Patented Dec. 31, 1940

2,226,803

UNITED STATES PATENT OFFICE 2,226,803

AGE RESISTOR

William C. Calvert, Chicago, Ill., assignor to Wingfoot Corporation, Wilmington, Del., a corporation of Delaware No Drawing. Application July 17, 1936, Serial No. 91,104

19 Claims. (Cl. 260—804)

This invention relates to a method of preserving rubber and other unsaturated organic materials subject to deterioration. More particularly, it relates to condensation products suitable for use as age-resistors or antioxidants in rubber.

Heretofore it has been proposed to replace individual chemical compounds, such as phenyl beta naphthlyamine, as age resistors for rubber and the like with complex reaction products of two or more substances. Such complex reaction mixtures are usually less expensive to make than the individual compounds due to the fact that little or no purification is ordinarily necessary and they also possess the advantage that the complex mixture can be incorporated into rubber to a greater extent than the individual compounds without blooming on the surface of the article. The present invention concerns such complex reaction products prepared by condensing a halogen-substituted aldehyde with an aromatic amine, the product being a resinous material possessing antioxidant properties.

The halogenated aldehyde can be any one of the large number denoted by this term, the halogen being either chlorine, bromine or iodine, but a chlorinated compound is usually employed due to its lower cost. Thus, there may be used 3-chlor-butanal, chlor ethanal, 3-chlor propanal, x-chlor pentanal, 2-methyl 3-chlor pentanal, 2-ethyl 3-chlor hexanal, brom ethanal, 3-brom propanal, 3-brom-butanal, iodo-ethanal, 3-iodo propanal, etc. An aliphatic halogenated aldehyde is ordinarily used, due to the greater availability of this class of aldehydes, but aromatic halogenated aldehydes may also be employed.

The aryl amine to be condensed with any of the foregoing halogenated aldehydes or others of the same class may be primary aryl, secondary diaryl or secondary alkyl aryl or it may be an aralkyl amine. Among the amines which may be used are the following: aniline, ortho toluidine, para toluidine, xylidine, alpha naphthylamine, beta naphthylamine, diphenyl amine, phenyl alpha naphthylamine, phenyl beta naphthylamine, phenyl ortho tolyl amine, phenyl para tolyl amine, ortho tolyl alpha naphthylamine, para tolyl alpha naphthylamine, ortho tolyl beta naphthylamine, para tolyl beta naphthylamine, methyl aniline, ethyl aniline, isopropyl aniline, N-n-butyl aniline, amyl aniline, iso amyl aniline, methyl toluidine, ethyl toluidine, isopropyl toluidine, the amyl toluildines, methyl alpha naphthylamine, ethyl alpha naphthylamine, and the higher alkyl alpha naphthylamines and the corresponding alkyl beta naphthylamines, such as methyl beta naphthylamine, ethyl beta naphthylamine, isopropyl beta naphthylamine, etc. Of course, other aryl amines besides those mentioned can also be reacted with the halogenated aldehydes.

The age resistors of the invention are readily prepared by condensing the halogen-substituted aldehyde with the primary or secondary aromatic amine or with the secondary alkyl aryl amine to yield a resinous product. To illustrate the procedure followed, the following example is given, although it will be understood that variations in the conditions may be introduced as the character of the reactants necessitates:

Example

To 54.8 grams of phenyl beta naphthylamine is added 13.3 grams of 3-chlor butanal, the latter compound being prepared by passing dry HCl gas into crotonaldehyde until the theoretical weight is added. The mixture of amine and aldehyde is refluxed for one hour and is then dried by heating to about 200° C. A yield of 65.3 grams of a clear reddish-brown resinous product was obtained and tested in rubber.

From the foregoing example, it will be seen that the conditions of reaction for obtaining the age resistors are not severe, refluxing temperatures being, in general, sufficient and the reaction taking from 1 to 3 hours. The molecular proportions of the reactants in the foregoing example are two mols of the amine to one mol of the aldehyde but as many as three mols of amine may be added to one mol of aldehyde where the amine is basic enough, as in the case of primary amines and certain secondary amines. The ratio can also be less than this, a mol for mol ratio being used in some instances. Of course, these molecular ratios may be departed from to some extent, as where it is desired to insure substantially complete reaction of the more expensive ingredient, in which case an excess of the cheaper ingredient may be added and such excess later removed by distillation or other means.

Certain of the reaction products were tested in rubber to determine their age-resisting qualities, a rubber stock being employed having the following composition:

| | Parts by weight |
|---|---|
| Extracted pale crepe | 100 |
| Zinc oxide | 5 |
| Sulphur | 3 |
| Hexamethylene tetramine | 1 |
| Stearic acid | 1.5 |
| Chloro aldehyde amine condensate | 1 |

The rubber samples were then subjected to low temperature aging in an oxygen bomb at a temperature of 50° C. under a pressure of 150 pounds per square inch for a period of six days. The tensile strength and other physical properties were measured both before and after aging and the tensile ratio, (T. R.), or percentage of tensile strength remaining after ageing, was thus determined.

Results for some of the complex mixtures tested are tabulated below:

| Cure | Original tensile | Aged | | T. R. |
|---|---|---|---|---|
| | | Tensile | Percent weight inc. | |
| 3-CHLOR BUTANAL + PHENYL BETA NAPHTHYLAMINE | | | | |
| | | | | Percent |
| 35/285 | 153 | 156 | .18 | |
| 50 | 149 | 172 | .15 | 107 |
| 70 | 163 | 170 | .26 | |
| 3-CHLOR BUTANAL + N-N-BUTYL ANILINE | | | | |
| 35/285 | 116 | 130 | .02 | |
| 50 | 132 | 149 | .09 | 104 |
| 70 | 154 | 141 | .44 | |
| 3-CHLOR BUTANAL + DIPHENYL AMINE | | | | |
| 35/285 | 138 | 127 | .03 | |
| 50 | 156 | 132 | .18 | 85 |
| 70 | 164 | 134 | .44 | |
| 3-CHLOR BUTANAL + ALPHA NAPHTHYLAMINE | | | | |
| 35/285 | 92 | 87 | .08 | |
| 50 | 126 | 116 | .24 | 90 |
| 70 | 154 | 134 | .29 | |
| 3-CHLOR BUTANAL BETA NAPHTHYLAMINE | | | | |
| 35/285 | 100 | 90 | .21 | |
| 50 | 134 | 124 | .31 | 90 |
| 70 | 147 | 132 | .47 | |

It will be observed that the tensile strength of the aged samples was a very substantial proportion of the tensile strength before ageing, indicating that these complex mixtures are good antioxidants. The compounds may also be used for preserving other organic materials of an unsaturated nature which are subject to oxidation and deterioration, such as gasoline, vegetable oils and the like.

However, the complex mixtures are more particularly intended for the treatment of rubber and, by the term "rubber" in the appended claims, it is intended to include not only rubber but other rubber-like materials such as balata, gutta percha, reclaimed rubber, synthetic rubber, latex and the like, whether or not the same have been admixed with vulcanizing agents, accelerators, pigments, fillers or other adjuvants customarily added thereto. The method of treating the rubber may be any found to be effective, as by incorporation of the rubber before vulcanization, application to the surface of the rubber article after vulcanization, and suspension or solution in latex.

While there have been pointed out above certain preferred embodiments of the invention, the same is not limited to such illustrations but is capable of variation and modification as to the reactants employed, proportions and conditions. Accordingly, it is intended that the invention shall be defined only by the accompanying claims in which it is intended to include all features of patentable novelty residing in such invention.

What I claim is:

1. An age-resisting rubber composition comprising rubber and a condensation product of one mol of 3-chlor butanal and from one to three mols of phenyl beta naphthylamine.

2. An age-resisting rubber composition comprising rubber and a condensation product of one mol of 3-chlor butanal and from one to three mols of N-n-butyl aniline.

3. A method of preserving organic materials of unsaturated nature and subject to deterioration due to oxidation which comprises treating the same with a composite condensation product of a halogenated aldehyde and an aromatic amine containing at least one hydrogen in the amino group, the halogenated aldehyde being present in amount of one mol to from one to three mols of the amine.

4. A method of preserving rubber which comprises treating the same with a composite condensation product of a halogenated aldehyde and an aromatic amine containing at least one hydrogen in the amino group, the halogenated aldehyde being present in amount of one mol to from one to three mols of the amine.

5. A method of preserving rubber which comprises treating the same with a composite condensation product of a halogenated aldehyde and a primary aromatic amine containing at least one hydrogen in the amino group, the halogenated aldehyde being present in amount of one mol to from one to three mols of the amine.

6. A method of preserving rubber which comprises treating the same with a composite condensation prodct of a halogenated aldehyde and a secondary diaryl amine, the halogenated aldehyde being present in amount of one mol to from one to three mols of the amine.

7. A method of preserving rubber which comprises treating the same with a composite condensation product of a halogenated aldehyde and an N-alkyl aryl amine containing at least one hydrogen atom in the amino group, the halogenated aldehyde being present in amount of one mol to from one to three mols of the amine.

8. A method of preserving rubber which comprises treating the same with a composite condensation product of a halogenated aliphatic aldehyde and an aromatic amine containing at least one hydrogen in the amino group, the halogenated aldehyde being present in amount of one mol to from one to three mols of the amine.

9. A method of treating rubber which comprises incorporating therein a composite condensation product of about one mol of a chlorinated aliphatic aldehyde and about two mols of an aromatic amine containing at least one hydrogen in the amino group.

10. A method of treating rubber which comprises incorporating therein a composite condensation product of a chlorinated aliphatic aldehyde and a diaryl amine containing at least one hydrogen atom in the amino group, the chlorinated aldehyde being present in amount of one mol to from one to three mols of the amine.

11. A method of treating rubber which comprises incorporating therein a composite condensation product of a chlorinated aliphatic aldehyde and an N-alkyl aryl amine containing at least one hydrogen atom in the amino group, the chlorinated aldehyde being present in amount of one mol to from one to three mols of the amine.

12. A method of preserving rubber which comprises treating the same with a composite condensation product of chlor butanal and an aromatic amine containing at least one hydrogen atom in the amino group, the chlor butanal being present in amount of one mol to from one to three mols of the amine.

13. A method of preserving rubber which comprises treating the same with a composite condensation product of chlor butanal and a diaryl amine containing at least one hydrogen atom in the amino group, the chlor butanal being present in amount of one mol to from one to three mols of the amine.

14. A method of preserving rubber which comprises treating the same with a composite condensation product of chlor butanol and an N-alkyl aryl amine containing at least one hydrogen atom in the amino group, the chlor butanal being present in amount of one mol to from one to three mols of the amine.

15. A method of treating rubber which comprises incorporating therein before vulcanization the composite condensation product of 3-chlor butanal and phenyl beta naphthylamine, the 3-chlor butanal being present in amount of one mol to from one to three mols of the amine.

16. A method of treating rubber which comprises incorporating therein before vulcanization the composite condensation product of 3-chlor butanal and N-n-butyl aniline, the 3-chlor butanal being present in amount of one mol to from one to three mols of the amine.

17. A method of treating rubber which comprises incorporating therein before vulcanization the composite condensation product of 3-chlor butanal and beta naphthylamine, the 3-chlor butanal being present in amount of one mol to from one to three mols of the amine.

18. An age resisting rubber composition comprising rubber and a composite condensation product of one mol of a chlorinated alkyl aldehyde and from one to three mols of an aryl amine containing at least one hydrogen on the amine nitrogen.

19. An age resisting rubber composition comprising rubber and a composite condensation product of one mol of a halogenated aldehyde and from one to three mols of a diaryl amine containing at least one hydrogen on the amine nitrogen.

WILLIAM C. CALVERT.

CERTIFICATE OF CORRECTION.

Patent No. 2,226,803.　　　　　　　　　　　　　　　December 31, 1940.

WILLIAM C. CALVERT.

It is hereby certified that error appears in the printed specification of the above numbered patent requiring correction as follows: Page 3, first column, line 12, claim 14, for "butanol" read --butanal--; and that the said Letters Patent should be read with this correction therein that the same may conform to the record of the case in the Patent Office.

Signed and sealed this 11th day of February, A. D. 1941.

Henry Van Arsdale,
Acting Commissioner of Patents.

(Seal)